Patented Feb. 16, 1926.

1,573,605

UNITED STATES PATENT OFFICE.

FRITZ GÜNTHER, OF LUDWIGSHAFEN-ON-THE-RHINE, GERMANY, ASSIGNOR TO BADISCHE ANILIN- & SODA-FABRIK, OF LUDWIGSHAFEN-ON-THE-RHINE, GERMANY, A CORPORATION OF GERMANY.

MANUFACTURE OF AZO DYESTUFFS.

No Drawing.   Application filed July 13, 1925.   Serial No. 43,410.

*To all whom it may concern:*

Be it known that I, FRITZ GÜNTHER, citizen of the German Empire, residing at Ludwigshafen-on-the-Rhine, Germany, have invented new and useful Improvements in the Manufacture of Azo Dyestuffs, of which the following is a specification.

I have found that azo-dyestuffs of the type salicylic acid—N=N—(p)aryl—X—aryl(p)—N=N—salicylic acid containing one or more than one sulfonic acid group and as a linking X either an azo or azoxy group or the urea grouping

—NH—CO—NH—, excel by very good tinctorial properties, especially by dyeing both animal and vegetable fibres fast shades. They are also very suitable for dyeing mixed fabrics. In all cases, in the above formula, "salicylic acid" is meant to include also homologues, such as cresotinic acids and others.

Dyestuffs of the aforesaid type, so far as they contain the azo or the azoxy group as a linking X, can be obtained from the azo dyestuffs derived from diazotized p-nitro-aryl-amine-sulfonic acids and salicylic acid by reducing with the aid of an alkaline reducing agent in such a manner that two molecules of the azo dyestuff are linked together by means of the nitrogen atoms of the nitro groups. Probably a new azo or an azoxy group will thereby be formed and act as the linking. The new dyestuffs, contrary to the sulfonated products employed for reduction, have the character of direct dyestuffs and produce from orange to reddish brown shades possessing valuable properties.

The same or very similar azo dyestuffs can also be obtained by starting from unsulfonated azo dyestuffs derived from p-nitro-arylamine and salicylic acid and either sulfonating it before applying alkaline reduction or first reducing it by an alkaline reducing agent in order to effect the aforementioned linking of two molecules and sulfonating the reduction product.

Azo coloring matters in accordance with the type mentioned above, so far as they contain the urea grouping, can be obtained for example, by sulfonating the unsulfonated dyestuffs derived from diamino-di-aryl-urea and two molecules of salicylic acid, or its homologues or derivatives, which sulfonation can be carried out in the usual way without any decomposition taking place. Very similar sulfonated products can be obtained by diazotizing a sulfonated diamino-diaryl-urea and combining with two molecules of the salicylic acid body, or by starting from an amino-arylene-sulfonic acid-azo-salicylic acid body (for example obtained from p-nitraniline-sulfonic acid and salicylic acid with subsequent reduction) and treating it with phosgene. The shades produced with such products are a bright yellow.

The following examples will serve to explain the invention further but the invention is not restricted to these examples. The parts are by weight, unless otherwise stated.

*Example 1.*

100 parts of the azodyestuff para-nitraniline ortho sulfonic acid (diaz.) + salicylic acid are suspended in about 300 parts of water of room temperature and, while stirring, rapidly mixed with 200 parts, by volume, of a sodium sulfid solution, prepared by dissolving crystallized sodium sulfid in its own weight of water. The slight development of heat occurring is checked by an addition of ice. Stirring is continued for a while at room temperature and the dyestuff eventually filtered off, after adding, if required, a little common salt solution. Its structural formula is probably the following one:

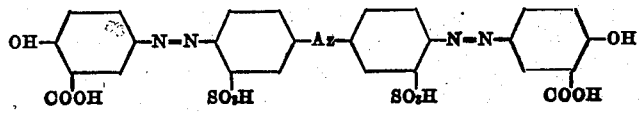

in which formula "Az" stands for the azoxy

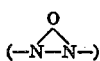

or azo (—N=N—) group, it being not definitely ascertained which one has been formed. It can be further purified by again dissolving it in water and re-precipitating it by means of sodium chlorid. When boiled with solutions of suitable chromium salts it gives a water-soluble chromium compound which like the dyestuff itself has the property of dyeing cotton directly. The dyeings obtained with such chromium compound or with a dyeing liquor containing the chrome-free dyestuff and a suitable chromium salt are of an extraordinary fastness. They have a valuable copper shade.

*Example 2.*

The azo dyestuff obtained from para-nitraniline and salicylic acid is reduced in an alkaline bath to convert the nitro groups into the azo or azoxy group and 20 parts of the reduced and dried dyestuff which probably has the structural formula:

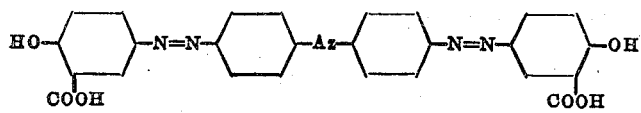

in which formulas "Az" stands for the azoxy

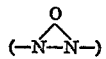

or azo (—N=N—) group, it being not definitely ascertained which one has been formed, are sulfonated by means of 200 parts of fuming sulfuric acid of 23 percent $SO_3$ at about 100 degrees centigrade. After sulfonating the mass is poured into water, heated, preferably with an addition of common salt, filtered and the dyestuff converted into its sodium salt, which can be purified, if desired, by dissolving in water and re-precipitating with salt. The dyestuff which probably has the following structural formula:

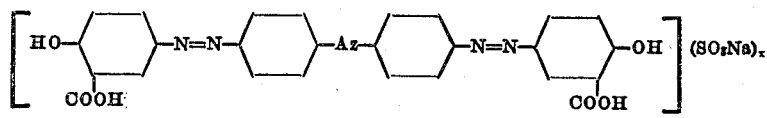

dyes animal as well as vegetable fibre brownish red shades.

*Example 3.*

200 parts of the azo-dyestuff from p-nitraniline and salicylic acid are introduced into between 8 and 10 times their weight of fuming sulfuric acid of 23 percent $SO_3$, while stirring and then heating the mixture to about 100 degrees centigrade for several hours. When sulfonation is complete, the mixture is allowed to cool and poured into water. The dyestuff is then converted into its sodium salt which is dried and dissolved in about 4000 parts of water and reduced by means of 80 parts of grape sugar and 190 parts of caustic soda lye of 40 degrees Bé. When reduction is effected, the solution is neutralized with hydrochloric acid and the dyestuff which separates out, filtered off, when cool. The dyestuff which probably has the structural formula:

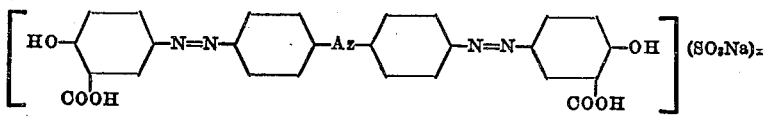

dyes vegetable and animal fibres brownish orange shades.

*Example 4.*

10 parts of the disazo-dyestuff obtained from p.p-di-amino-diphenyl-urea and two molecules of salicylic acid are introduced, at room temperature, while stirring, into 100 parts of fuming sulfuric acid of 23 per cent $SO_3$ and subsequently heated to about 75° centigrade for a couple of hours. Thereafter, the mass is poured on ice, the dyestuff filtered off, washed with water and dissolved in sodium carbonate solution, salted out, filtered and dried. The structural formula is probably as follows:

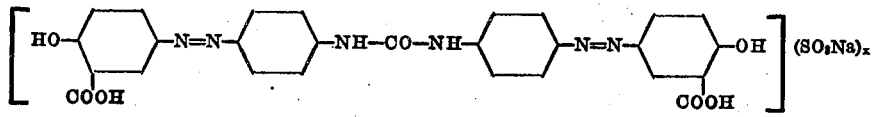

Other modifications of our invention can be carried out in an analogous or any usual or suitable way.

Now what I claim is:

1. As new articles of manufacture azo coloring matters for animal, vegetable and mixed fabrics, which contain the grouping —N=N—aryl(p)—X—(p)aryl—N=N—

(X standing for the azo or azoxy group or the urea grouping), coupled with an ortho-oxy-carboxylic acid, and containing sulfonic acid groups.

2. As a new article of manufacture, an azo dyestuff containing the grouping salicylic acid—N=N—ary(p)—N=N—(p)aryl—N=N—salicylic acid and sulfonic acid groups in the aryl residues.

3. A process of manufacturing an azo dyestuff, which consists in subjecting azodyestuffs derived from sulfonated para-nitro-arylamines and a salicylic acid body to alkaline reduction suitable to convert two nitro groups into an azo or azoxy group.

In testimony whereof I have hereunto set my hand.

FRITZ GÜNTHER.